United States Patent [19]

Moreman, III

[11] 4,046,435

[45] Sept. 6, 1977

[54] BEARING SEAT USABLE IN A GAS TURBINE ENGINE

[75] Inventor: Otis S. Moreman, III, Cincinnati, Ohio

[73] Assignee: The United States of America as represented by the Administrator of the National Aeronautics and Space Administration, Washington, D.C.

[21] Appl. No.: 595,745

[22] Filed: July 14, 1975

[51] Int. Cl.$^2$ .............................................. F16C 13/00

[52] U.S. Cl. ...................................... 308/195; 290/52

[58] Field of Search ......................... 308/194, 26, 195; 290/52

[56] References Cited

U.S. PATENT DOCUMENTS

| | | | |
|---|---|---|---|
| 2,632,677 | 3/1954 | Potter | 308/194 |
| 2,975,007 | 3/1961 | Zwicker | 308/194 |
| 3,467,452 | 9/1969 | McElroy | 308/26 |

*Primary Examiner*—Joseph F. Peters
*Assistant Examiner*—Richard A. Bertsch
*Attorney, Agent, or Firm*—Norman T. Musial; Derek P. Lawrence; Henry J. Policinski

[57] ABSTRACT

In a gas turbine engine having a blade and mounting ring assembly adapted for rotation about a first axis including a plurality of blades mounted on said ring for rotation about a second axis and a plurality of bearing assemblies, each associated with one of said blades, an improved bearing seat is provided for seating the plurality of bearing assemblies.

4 Claims, 3 Drawing Figures

BEARING SEAT USABLE IN A GAS TURBINE ENGINE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to bearing support means and, more particularly, to bearing support means for variable pitch fan blades associated with gas turbine engines.

Power plants recently developed for large aircraft have included gas turbine engines wherein a power turbine associated with the core engine drives a large diameter fan which provides propulsive thrust for the aircraft. While in the past such fans have generally utilized fan blades having a fixed-pitch, more recently fan-type gas turbine engines have been provided with variable pitch fan blades to increase the operating efficiency of the engine over the entire range of the operating cycle.

In fan-type gas turbine engines, individual fan blades are secured to a disc attached to a shaft driven by a powered turbine such that both the disc and the fan blades rotate at high angular velocity about an axis comprising the centerline of the engine. In addition to the aforedescribed rotation, variable pitch fan blades are each rotatable about their own centerline to accommodate adjustments in blade pitch. Bearing assemblies and bearing seats used to support the fan blades for this latter rotation must be designed to function appropriately under high radial loads imposed by centrifugal forces associated with rotation about the engine centerline and yet must be compatible with weight and cost limitations of the engine.

Currently, it is the practice of those skilled in the art to seat each individual bearing assembly in separate recesses machined into the disc. Since each seat is distinct and remote from each of the other seats, machining of individually recessed seats requires separate machining operations and associated sequential indexing for each seat. Machining of individual recessed seats is additionally complicated by the disc configuration which limits cutting tool access to the bearing seat surface such that conventional straight drive machining equipment cannot be utilized. Rather, right-angle drive boring and facing equipment must be used. As a result of these additional and intricate steps, fabrication of the bearing seats is time consuming and require expensive machinery, a great degree of operator attention and substantial quality monitoring of each individual recess. The present invention overcomes the aforestated problems associated with the current prior art practice by providing a substantially continuous seating surface which seats a plurality of bearings and which can be fabricated in an economical and relatively expedient manner.

SUMMARY OF THE INVENTION

Accordingly, it is an object of the present invention to provide a new and improved variable pitch fan assembly for a fan-type gas turbine engine.

It is a further object of the present invention to provide a new and improved bearing assembly and bearing seat which may be readily adaptable to the operational environment associated with variable pitch fans in gas turbine engines.

Briefly stated, these and other objects of the present invention, which will become apparent from the following detailed description and accompanying drawings, are accomplished by the present invention which in one form provides for an annular mounting ring or flange portion having a plurality of circumferentially spaced and radially extending apertures therein and further provides for a plurality of radially extending blades, each having at its radially inner end a shank portion partially disposed within said apertures. Means are provided for retaining each shaft in its associated aperture. A plurality of circumferentially spaced bearing assemblies are each disposed adjacent one of the shanks to promote rotation of the blades on the ring. A radially inwardly facing and substantially continuous axially and circumferentially extending seating surface is provided on the ring which seats at least two of the bearing assemblies and in the preferred embodiment such surface provides a seat for all of the bearing assemblies.

DESCRIPTION OF THE DRAWINGS

While the specification concludes with claims particularly pointing out and distinctly claiming the subject matter of the present invention, the invention will be more fully understood from the following description of the preferred embodiments which are given by way of example with the accompanying drawings wherein:

DESCRIPTION OF THE PREFERRED EMBODIMENT

Figure 1:
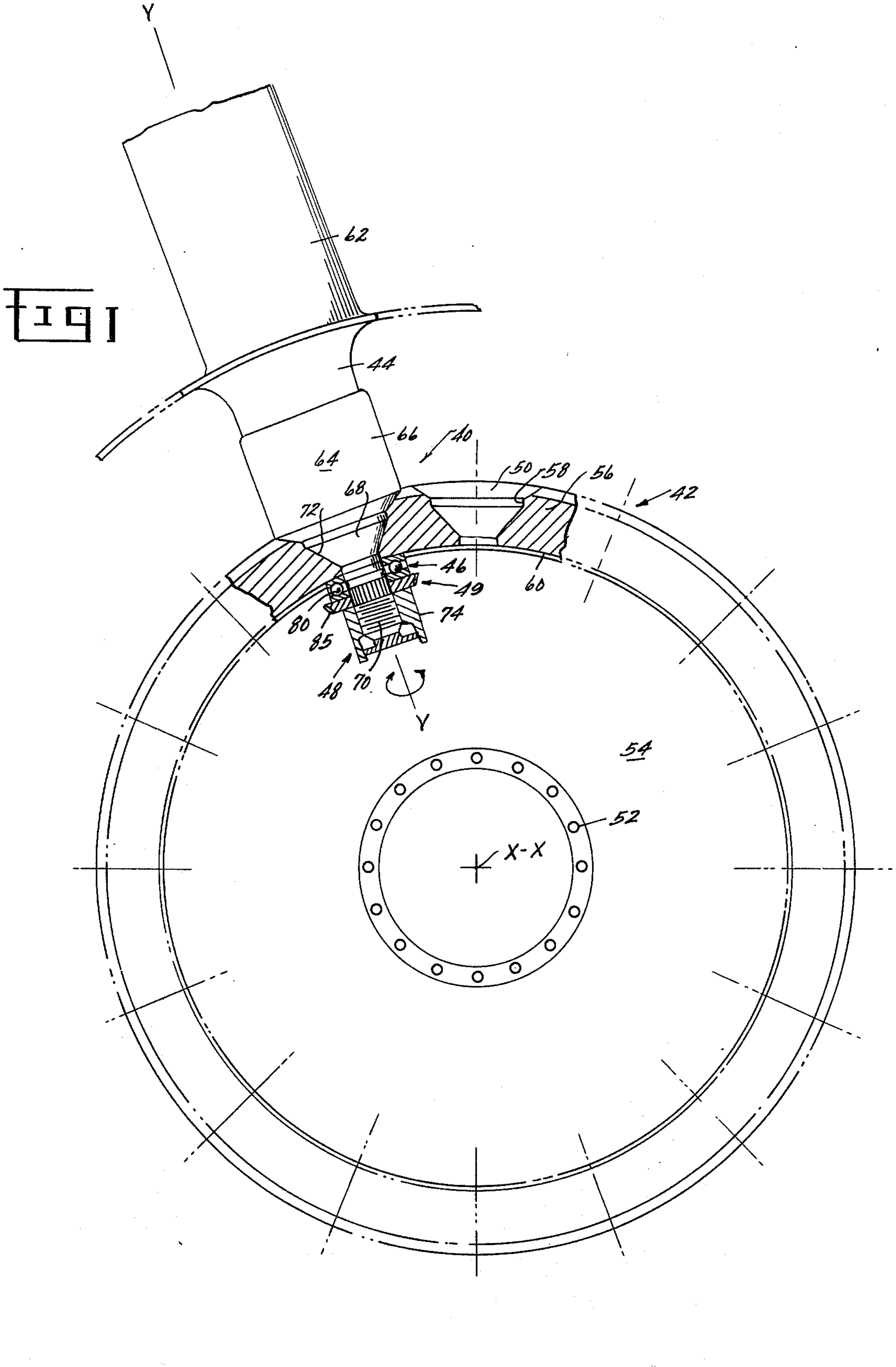
FIG. 1 is a frontal schematic view of a fan disc with one fan blade shown in its mounting environment in the disc flange and the position of the other fan blades indicated by centerlines.

Referring to the drawings, it is readily apparent that typical assemblies and subassemblies of a gas turbine engine are not shown therein. It is generally well known in the art that a typical gas turbine front fan engine is comprised of a fan assembly positioned forward of a core engine, the latter including, in serial flow relationship, a compressor, a combustor, a high pressure turbine adapted to drive the compressor, a low pressure turbine adapted to drive the fan assembly, and a core nozzle. Air ingested into the compressor is compressed and discharged into a combustor wherein the air is mixed with fuel and burned. The high energy hot gases produced by burning the mixture emerge from the combustor and are directed through the high pressure turbine wherein energy is extracted to drive the compressor. The lower energy combustion gases are then directed through a low pressure turbine wherein additional energy is extracted to drive the fan asssembly which operates to effect a propulsive force to power the aircraft. The hot gases are finally discharged through the core engine nozzle to provide an additional propulsive force.

While the present invention is well adapted for cooperation with the core engine described above, it is capable of application to any multibladed engine which might differ in some manner from the aforedescribed typical gas turbine engine.

Directing attention to FIG. 1, a fan assembly is shown generally at 40 and is comprised of fan disc 42, a plurality of fan blades 44 (only one of which is shown and the position of the others indicated by centerlines), a plurality of bearing assemblies 46, a plurality of blade retaining means 48 and a plurality of pinion gears 49. Each fan blade 44 is associated with one of a plurality of radially extending apertures 50 in fan disc 42 and is supported for rotation about a second axis Y—Y therein in a manner hereinafter to be described. Fan disc 42 is secured to a drive shaft (not shown) by conventional means cooperating with mounting holes 52 whereby fan disc 42 is rotatably driven about a first axis X—X to provide propulsive power.

Figure 3:
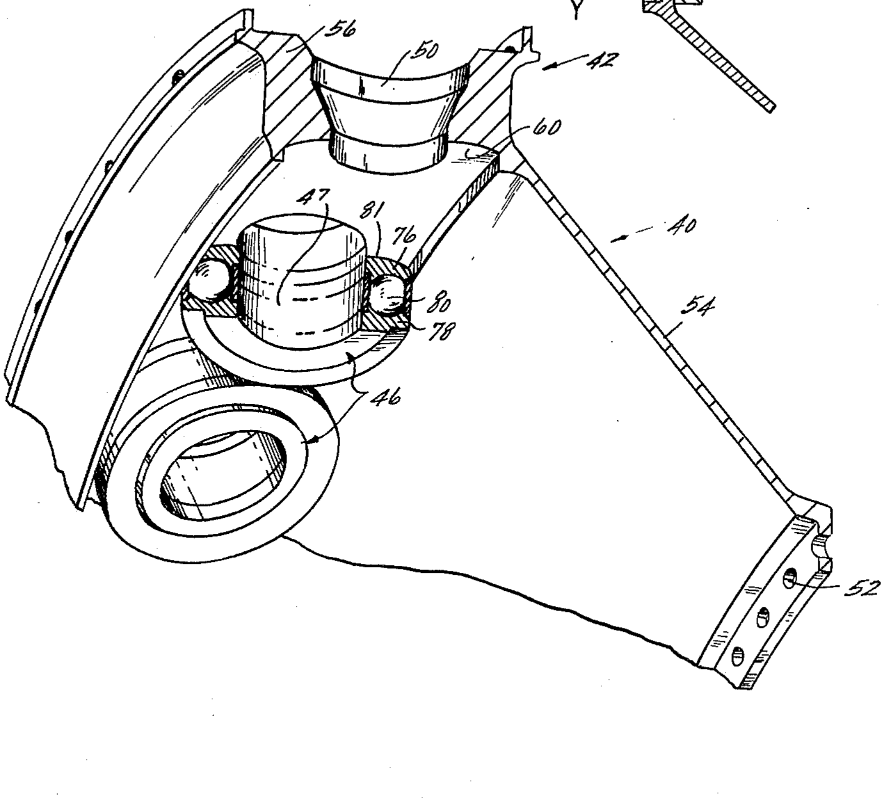
FIG. 3 is a perspective view of a segment of the fan disc depicting bearing assemblies and the bearing seat arrangement of the present invention.

Fan disc 42 has a conically shaped hub portion 54 with an axially and circumferentially extending annular mounting ring or flange 56 integrally connected thereto (both better observed in FIG. 3). While a fan disc is shown in FIG. 3, other means, such as a cylindrical drum, can be used as a carrier for fan blades 44 and the present invention is equally adaptable to such alternate structure. In the embodiment depicted in the drawings, the aforementioned apertures 50 are disposed in flange 56 at equally spaced circumferential intervals. Each aperture 50 is shown to be comprised of a series of consecutively stepped diameter portions 58 arranged such that the diameter of the aperture 50 decreases in the radially inwardly direction. Flange 56 includes a radially inwardly facing, circumferentially and axially extending seating surface 60 upon which each individual bearing assembly associated with each fan blade 44 is seated. Seating surface 60 is substantially continuous around the inner periphery of flange 56, the only interruptions therein being apertures 50.

Each fan blade 44 incorporates an airfoil 62 with a shank 64 adapted to penetrate into and through one of the apertures 50 in fan disc 42. The shank 64 includes an enlarged generally cylindrical portion 66 and a smaller generally cylindrical portion 68. Threads 70 are formed in cylindrical portion 68 near its radial innermost end for purposes hereinafter to be described. Between enlarged cylindrical portion 66 and threads 70, cylindrical portion 68 is comprised of a series of stepped diameter segments 72 arranged such that diameter of cylindrical portion 68 decreases in the radially inwardly direction. Segments 72 are adapted to matingly engage stepped diameter portions 58 of aperture 50 thereby effecting support of blade 44 on fan disc 42.

Figure 2:
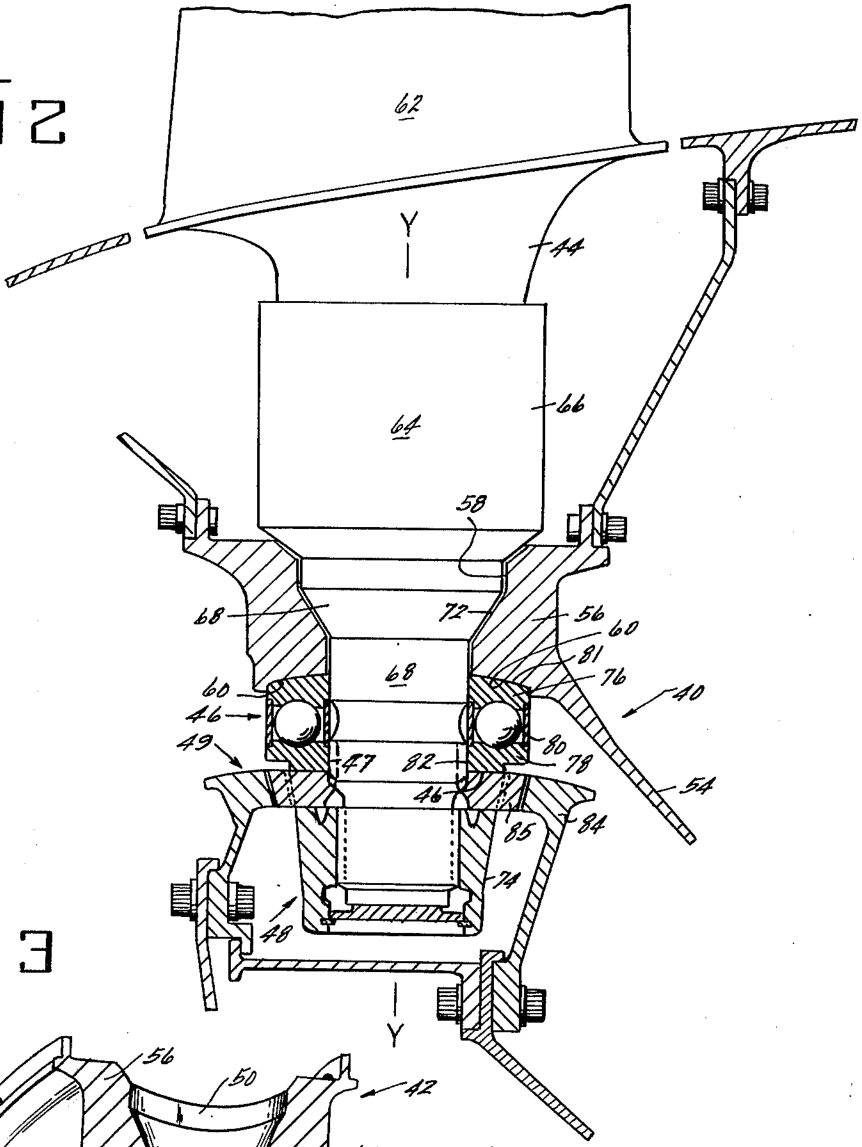
FIG. 2 is a side view depicting partially in cross section a rotatable fan blade mounted in the disc flange in accordance with the present invention.

Referring now to FIG. 2, fan blades 44 each extend into and through one of the plurality of apertures 50 such that enlarged cylindrical portion 66 is disposed radially outward of flange 56 and part of smaller cylindrical portion 68 is disposed radially inward of flange 56. Radially inwardly of flange 56, cylindrical portion 68 cooperates with bearing assembly 46, pionion gear 49 and nut 74 in such a manner so as to provide for retention of blade 44 in aperture 50 and rotation of blade 44 in aperture 50 during adjustments in pitch of airfoil 62. More specifically, bearing assembly 46, comprised of an annular radially outer race 76, an annular radially inner race 78 and bearing elements 80, circumscribes and engages cylindrical portion 68 of shank 64. Bearing assembly 46, including races 76 and 78, are generally circular and disposed coaxially with axis Y—Y. Outer race 76 fits loosely around cylindrical portion 68 and has a radially outwardly facing surface 81 which is seated on seat surface 60 of flange 56. Inner race 78 and pinion gear 49 are each secured to cylindrical portion 68 by conventional splined attachment as shown at 82 such that while each is free to slide axially along cylindrical surface 68 in the direction of the Y—Y axis, each is constrained to rotate in unison with fan blade 44 about the Y—Y axis. Nut 44 is threaded onto threads 70 of cylindrical portion 68 and tightened until bearing assembly 46 and pinion gear 49 are securely trapped between nut 44 and surface 60. In this position surface 81 of bearing assembly 46 is held seated on surface 60 and stepped diameter segments 72 are held adjacent stepped diameter portions 58 of aperture 50. Drive gear assembly 84 engages pinion gear 49 in a conventional manner at 85 to effect rotation of pinion gear 49, inner race 78 and blade 44 about the Y—Y axis to achieve adjustments in pitch of airfoil 62.

As best observed in FIGS. 1 and 3, seat surface 60 extends 360° around the inner periphery of flange 56 and is disposed such that all points on the surface in a given radial plane are equidistant from the aforementioned first axis of rotation, that is the axis of rotation of disc 42. Seat surface 60 is adapted to engage each radially outwardly facing surface 81 on each outward bearing race 76 of bearing assemblies 46. Hence, one substantially continuous seat 60 extending 360° around the inner periphery of flange 56 is provided which seats the plurality of bearing assemblies 46.

Currently, as set forth above, it is the practice of those skilled in the art to seat each bearing assembly in separate recesses machined into flange 56 of fan disc 42. Current practice requires separate machining operations for each bearing seat and the use of expensive right-angled drive boring and facing machinery resulting in a time consuming manufacturing process, a great degree of operator attention and quality monitoring of each individual seat. The substantially continuous seat surface 60 embodied in the present invention avoids the aforementioned problems associated with the current practice. More specifically, while prior art devices required separate machining operations for each bearing seat, the seating surface 60 which seats a plurality of bearing asemblies can be machined by one machining operation wherein a single cutting tool having a cutting edge with a predetermined profile is rotated relative to the fan disc to inscribe a surface of revolution into the mounting ring or flange 56. Such surface of revolution comprises the seating surface 60.

While in the prior art practice the bearing seat surface must be machined by a cutting tool having an axis of rotation coaxial with axis Y—Y, the seat surface 60 of the present invention may be machined with a cutting tool having an axis of rotation coaxial with the axis of rotation X—X of fan disc 42. In the former instance a right-angel drive connection is required between the tool bit and the main power shaft of the machine, while in the latter no such mechanism is required. Hence, machining of seat surface 60 may be accomplished with much simpler and less expensive equipment. Finally, in the prior art practice each bearing seat must be individually machined requiring either a plurality of cutting heads or alternatively sequential indexing as the cutting tool is moved from one seat to the other. This time consuming sequential machining operation is avoided by the present invention which provides a single seating surface 60 for all bearing assemblies 46 which can be machined in one operation.

It is understood that the preferred embodiment as hereinfore described is illustrative of one form of the present invention and that other forms are possible without departing from the scope thereof as set forth in the appended claims.

I claim:

1. In combination with a gas turbine engine having a rotating blade and mounting ring assembly adapted for rotation about a first axis, the assembly including a plurality of blades, each of said blades being rotatably mounted on said ring for rotation about a second axis, said assembly further including a plurality of bearing assemblies each associated with one of said blades and disposed around the periphery of said rotating ring, the improvement comprising:

a substantially continuous seating surface on said ring, said seating surface adapted to engage and seat said plurality of bearing assemblies.

2. The invention as set forth in claim 1 wherein said seating surface comprises a radially inwardly facing surface extending axially in the direction of said first axis and circumferentially about said first axis.

3. The invention as set forth in claim 2 further comprising:

a plurality of bearing races each associated with one of said bearing assemblies, each of said races being generally circular and disposed coaxially with said second axis, each of said races engaging said seating surface.

4. In a gas turbine engine including a blade and mounting ring assembly adapted to be rotatable about a first axis, said assembly including a plurality of blades rotatably secured to said ring, the improvement comprising:

an annular ring extending circumferentially about, axially along and radially from said first axis, said ring having a plurality of circumferentially spaced apertures extending radially through said ring and a radially inwardly facing substantially continuous axially and circumferentially extending seating surface;

a plurality of radially extending blades, each blade having at its radially innermost end a shank portion partially disposed within one of said apertures;

means for cooperating with said shanks for retaining said shank portions disposed within said apertures; and a plurality of circumferentially spaced bearing assemblies each disposed adjacent one of said shanks and each including an outer race having a radially outwardly facing surface, said radially outwardly facing surface of at least two of said bearing assemblies engaging said seating surface.

* * * * *